(12) United States Patent
Raasch

(10) Patent No.: US 8,403,102 B2
(45) Date of Patent: Mar. 26, 2013

(54) AUTOMATIC ENGINE SPEED ADJUSTMENT

(75) Inventor: Jason J. Raasch, Cedarburg, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 1286 days.

(21) Appl. No.: 12/174,655

(22) Filed: Jul. 17, 2008

(65) Prior Publication Data

US 2010/0004093 A1 Jan. 7, 2010

Related U.S. Application Data

(60) Provisional application No. 61/078,760, filed on Jul. 7, 2008.

(51) Int. Cl.
*B60W 10/04* (2006.01)
*B60K 20/00* (2006.01)
*B60K 23/00* (2006.01)

(52) U.S. Cl. ........................................ 180/336; 180/335

(58) Field of Classification Search .................. 180/336, 180/335, 332, 321, 322, 324
See application file for complete search history.

(56) References Cited

U.S. PATENT DOCUMENTS

| | | | | |
|---|---|---|---|---|
| 2,163,108 | A * | 6/1939 | Smith | 172/292 |
| 3,995,510 | A * | 12/1976 | Yost | 74/478.5 |
| 4,889,006 | A | 12/1989 | Kolinske et al. | |
| 5,725,068 | A * | 3/1998 | Smith et al. | 180/307 |
| 6,311,663 | B2 | 11/2001 | Gracyalny et al. | |
| 6,367,574 | B1 * | 4/2002 | Steiner | 180/333 |
| 6,648,603 | B2 | 11/2003 | Dexter et al. | |
| 7,673,815 | B2 * | 3/2010 | Schroeder et al. | 239/332 |
| 8,038,413 | B2 * | 10/2011 | Gilpatrick | 417/34 |
| 2006/0218887 | A1 * | 10/2006 | Osborne | 56/10.8 |
| 2008/0014096 | A1 * | 1/2008 | Gilpatrick | 417/34 |

* cited by examiner

*Primary Examiner* — Drew Brown
(74) *Attorney, Agent, or Firm* — Rathe Lindenbaum LLP

(57) ABSTRACT

An apparatus and method move a speed control lever of an engine automatically in response to movement of a manual actuator to engage a driven member.

29 Claims, 12 Drawing Sheets

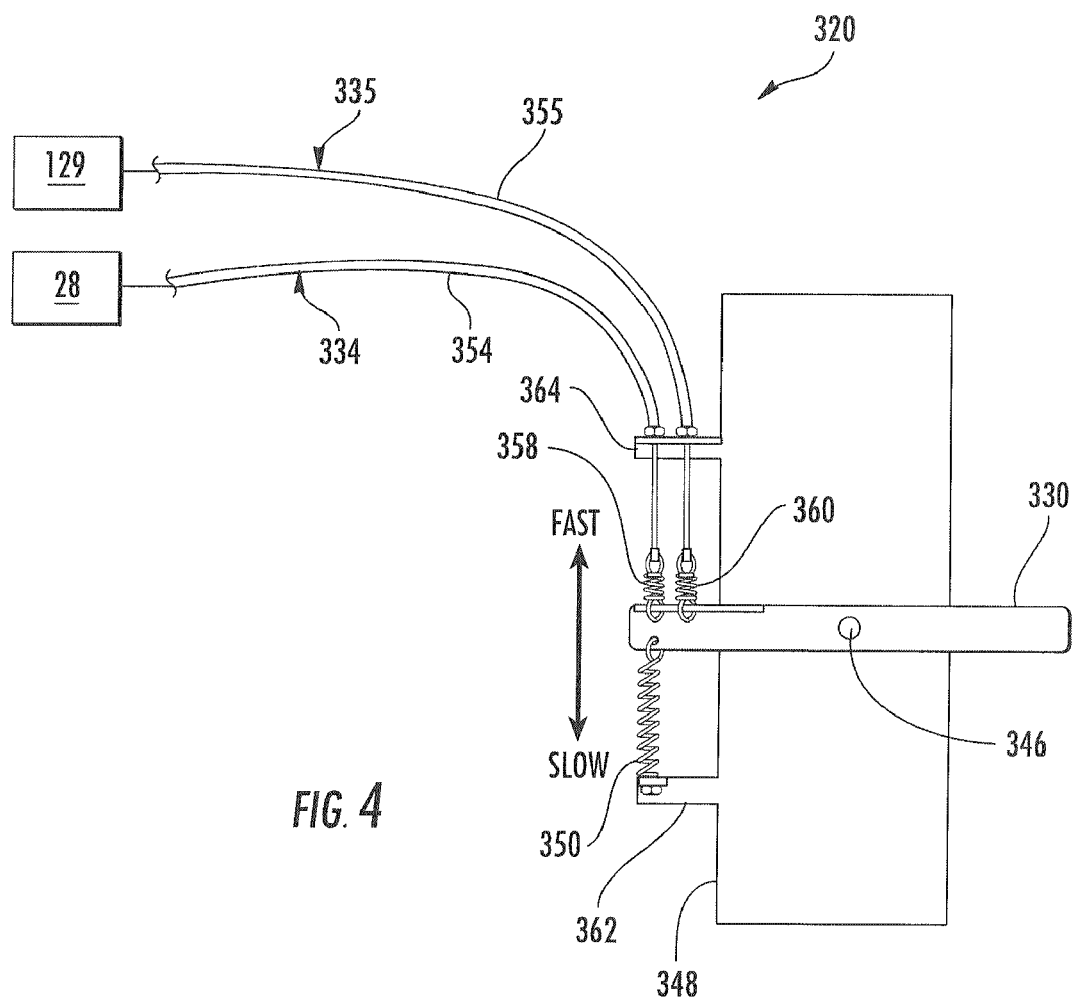

AUTOMATIC ENGINE SPEED ADJUSTMENT

BACKGROUND

Powered implements sometimes include one or more levers for engaging and disengaging various driven members of the powered implements such as a self-propel drive or rotating blades. Operating the powered implements at a high engine speed when the driven members are idle creates noise, increases wear and decreases energy efficiency.

BRIEF DESCRIPTION OF THE DRAWINGS

FIG. 4 is a schematic illustration of a particular embodiment of the powered implement of FIG. 2.

DETAILED DESCRIPTION OF THE EXAMPLE EMBODIMENTS

Figure 1:
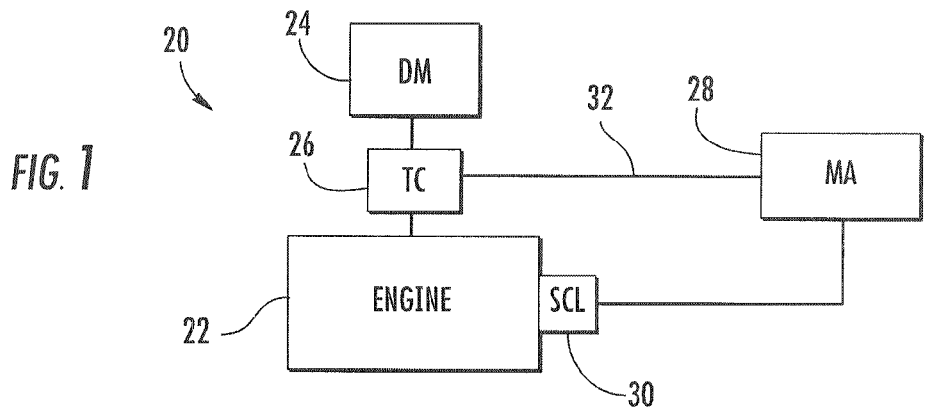
FIG. 1 is a schematic illustration of a powered implement according to one example embodiment.

FIG. 1 schematically illustrates powered implement 20 according to an example embodiment. Powered implement 20 comprises a device configured to automatically adjust a speed of its engine in response to engagement of one or more driven members or disengagement of one or more driven members. As a result, powered implement 20 creates less noise, operates with lower wear and achieves enhanced energy efficiency.

As shown by FIG. 1, powered implement 20 includes engine 22, driven member 24, transmission coupler 26 and manual actuator 28. Engine 22 comprises a machine that converts an energy source into mechanical power or motion for powering or driving driven member 24. In one embodiment, engine 22 comprises a small internal combustion engine such as those commercially available from Briggs and Stratton. In one embodiment, engine 22 comprises an internal combustion engine having a carburetor. In other embodiments come engine 22 may comprise an internal combustion engine having an electronic fuel ignition system. In still other embodiments, engine 22 may comprise an electrical engine (also known as a motor) for powering or driving driven member 24.

As further schematically shown by FIG. 1, engine 22 includes a throttle, throttle lever or speed control lever 30. Speed control lever 30 comprise a structure extending from a remainder of engine 22 and configured to move between speed positions which results in engine 22 operating at different speeds. For example, in one embodiment in which engine 22 comprises an internal combustion engine having a carburetor, speed control lever 30 comprises a lever movably coupled to a remainder of engine 22, having a first end projecting from a remainder of engine 22 and having another end operatively connected to the carburetor for controlling the speed of engine 22. In one embodiment, the control lever 30 pivots between a continuum of different positions for selectively setting engine 22 at any one of a continuum of different speeds. In other embodiments, depending upon the configuration of engine 22, speed control lever 30 may be connected to other components of engine 22 which regulate the speed of engine 22.

In one embodiment, speed control lever 30 is resiliently biased to a particular speed position by a spring or other mechanism attached to it and a frame of the implement. For example, in one embodiment, speed control lever 30 is resiliently biased by spring to a low-speed position or low engine speed position. In yet other embodiments, speed control lever 30 may be retained or may be held in any selected speed position depending upon the positioning of manual actuator 28, as will be described hereafter.

Driven member 24 comprises one or more structures configured to be powered or driven using force or torque supplied by engine 22. In one embodiment, driven member 24 comprises one or more working members configured to interact and modify the surrounding environment. For example, one embodiment, driven member 24 comprises a rotating blade or set of blades configured to interact with the soil such as with a cultivator or tiller. In one embodiment, driven member 24 comprises a rotating tine or set of times configured to interact with soil so as to aerate the soil as with an aerator. In one embodiment, driven member 24 comprises one or more rotating blades configured as one or more augers so as to transport or remove material such as snow as with a snow blower or snow thrower. In yet another embodiment, driven member 24 comprises a rotating blade or set of blades so as to cut such as with a lawnmower or edger.

In other embodiments, driven member 24 may comprise traction elements such as two or more wheels or tracks of a self propel drive configured to propel or move the powered implement across a surface without substantially altering or working upon the surface. For example, in one embodiment, the powered implement may comprise a walk-behind snow blower or snow thrower, a walk-behind lawnmower, a walk-behind edger, a walk-behind cultivator or tiller, a walk-behind aerator or other walk-behind powered implements, wherein driven member 24 propels the powered implement along the surface or terrain, reducing or eliminating the force that must be provided by a person using the powered implement to push or pull the powered implement across a terrain.

Transmission coupler 26 comprises a mechanism configured to selectively transmit force, power or torque from engine 22 to driven member 24. Transmission coupler 26 is actuatable or movable between a driving state in which engine 22 is operably coupled to driven member 24 to drive driven member 24 and an idling state in which engine 22 is operably decoupled from driven member 24. Transmission coupler 26 is configured to permit the supply of torque or power from engine 22 to driven member 24 to be stopped or interrupted such that driven member 24 may idle while engine 22 is still running. In one embodiment, transmission coupler 26 may comprise a clutch. In other embodiments, transmission coupler 26 may comprise other similar devices allowing the supply of power or torque from engine 22 to driven member 24 to be interrupted while engine 22 is running.

Manual actuator 28 comprises one or more members configured to be engaged or contacted by the physique of a person using implement 20, such as one or more hands or feet of a person. Manual actuator 28 is operably coupled to transmission coupler 26 by one or more cables, linkages and the like (schematically represented by line 32) that transmit force or motion of manual actuator 28 to transmission coupler 26 to move transmission coupler 26 between the driving state and the idling state. In another embodiment, manual actuator 28 may be operably coupled to transmission lever 26 by a powered actuator and an electrical switch. For example, in one embodiment, manual actuator 28 may be configured to trip or actuate an electrical switch upon being moved, wherein a powered actuator, such as an electric solenoid, engages and moves transmission coupler 26 between the driving state and idling state in response to tripping of the switch.

In one embodiment, manual actuator 28 comprises a pivoting handle or lever. In one embodiment, manual actuator 28 comprises such a lever positioned adjacent to a stationary handle or grip, wherein the lever may be pivoted against the bias of one or more springs into close proximity with the grip. For example, in one embodiment, the lever may be pivoted to a position substantially parallel to the grip. In other embodiments, manual actuator 28 may comprise a bail which pivots between different positions. In other embodiments, manual actuator 28 may comprise a push button, a sliding switch, a pedal, a pull rod, a push rod or the like.

As shown by FIG. 1, in addition to being operably coupled to transmission coupler 26, manual actuator 28 is also operably coupled to speed control lever 30. In one embodiment, manual actuator 28 is connected to speed control lever 30 by connector 34 (schematically shown).

In one embodiment, connector 34 is configured such that movement of manual actuator 28 in a first direction results in the movement of the control lever in the same first direction. In another embodiment, manual actuator 28 may be coupled to speed control lever 30 by connector 34 such that movement of manual actuator 28 in the first direction moves as the control lever in a second opposite direction or in a direction different than the first direction (such as a cable or chain and one or more pulleys or sprockets). In one embodiment, the connector 34 may be unidirectional such that connector 34 is capable of being placed in tension whereby the controller 30 may be pulled by connector 34 but may not be pushed by connector 34. In another embodiment, connector 34 may be bidirectional such that forces may be exerted upon speed control lever 30 in both directions (speed control lever 30 may be pushed or pulled by connector 34 depending upon the direction of force applied to connector 34 by movement of manual actuator 28).

In one embodiment, connector 34 may comprise a flexible member such as a wire, chain, belt or cable. For example, in one embodiment, connector 34 may comprise Bowden cable. In yet another embodiment, connector 34 may comprise a rigid assembly of one or more linkages.

In operation, when a person using an implement 20 desires to engage or actuate driven member 24, the person physically contacts or engages manual actuator 28 and moves manual actuator 28 from a first position in which transmission coupler 28 is in the idling state to a second position in which transmission coupler 26 is in the driving state. Such force (or electrical signals) are transmitted via the connection 32. As a result, driven member 24 begins to rotate or otherwise be driven. For example, implement 20 is propelled along the surface as one or more working members of implement 20, such as blades, are driven to engage plant life, soil or snow.

At the same time, such movement of manual actuator 28 also causes speed control lever 30 to move between different speed positions. In one embodiment, such movement causes engine 22 to increase an engine speed or rpm. In other embodiments in which speed control lever is biased to a low-speed position, the movement of actuator 28 applies a force to speed control lever 30 (or causes a force to be applied to speed control lever 30 by a powered actuator) to move the control lever 30 against the bias to a high-speed position position.

When the person no longer desires to use driven member 24 for a temporary period, but does not wish to shut down implement 20 in its entirety or to shut down engine 22, the person physically engages or contacts manual actuator 28 to move manual actuator 28 to a second position. In one embodiment, such movement may be the result of the person simply releasing or letting go of the manual actuator 28, wherein manual actuator 28 automatically moves to a default position under the force of a bias such as a spring. Such movement of manual actuator 28 to the second position is transmitted as motion or force to transmission coupler 26 which moves transmission coupler 26 to the idling state. As a result, force, torque or motion from engine 22 is no longer transmitted to driven member 24. Driven member 24 is idle while engine 22 keeps running.

Such movement of manual actuator 28 to the second position results in speed control lever 34 being moved to a different speed position. In one embodiment, such movement of manual actuator 28 to the second position results in force, motion or electrical signals being transmitted to speed control lever 30 by connection 34 to move speed control lever 30. In another embodiment, such movement of manual actuator 28 to the second position stops the application of force to speed control lever 30, withdraws force from speed control lever 30 or releases or unlocks a retainer holding speed control lever 30 such that speed control lever 30 may be moved to a different speed position under the force of a bias, such as a spring, connected to speed control lever 30 and the frame or other structure of implement 20.

In one embodiment, such movement of manual actuator 28 causes the control lever 30 to automatically move to a low-speed position. As a result, when the person is no longer using the driven member 24 and driven member 24 is idling, engine 22 is automatically adjusted to a lower speed. One such scenario may occur when the person desires to temporarily stop using driven member 24 so as to remove an obstruction or other article potentially in the way of implement 20 (i.e. to move a tool, toy, hose, branch and the like from in front of a lawnmower, a snow thrower, a tiller or the like). To do so, the person may either move the manual actuator 28 or simply release his or her grip of manual actuator 28 such that manual actuator 28 moves under the force of a spring or other bias. As the person moves or releases manual actuator 28 and moves the obstruction or other article, engine 22 automatically adjusts to a lower speed, reducing engine wear, reducing noise and reducing fuel consumption. When the person wishes to resume use of driven member 24, engine 22 automatically adjusts once again to a higher engine speed.

Figure 2:
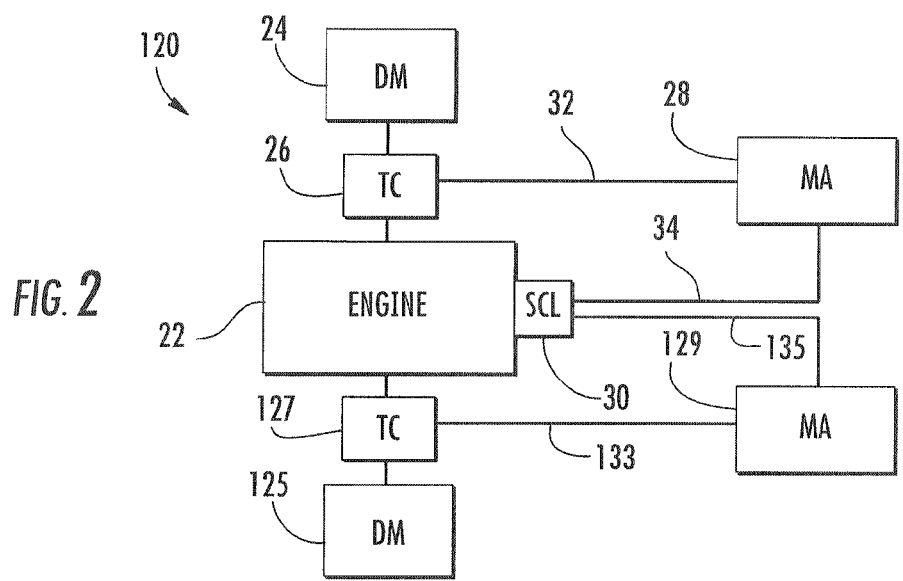
FIG. 2 is a schematic illustration of another embodiment of the powered implement of FIG. 1.

FIG. 2 schematically illustrates powered implement 120, another embodiment of implement 20 shown in FIG. 1. Like implement 20, implement 120 is configured to provide automatic engine speed adjustment in response to engagement or disengagement of one or more driven members. Implement 120 is similar to implement 20 except that implement 120 additionally includes driven member 125, transmission coupler 127 and manual actuator 129. Those remaining elements of implement 120 which correspond to elements of implement 20 are numbered similarly.

Driven member 125 is similar to driven member 24 except that driven the member 125 serves a different function as compared to driven member 24. In one embodiment where driven member 24 comprises one or more members configured to drive or propel implement 120 across a surface via traction elements such as a track or wheels, without such traction elements substantially working or altering the surface, driven member 125 may alternatively comprise a working member, such as a blade, configured to work upon plant life, snow or soil. In yet another embodiment, this relationship may be reversed. Like driven member 24, driven member 125 is driven or receives power, torque or motion from engine 22. Driven member 125 selectively receives such power, torque promotion depending upon the state of transmission coupler 127.

Transmission coupler 127 is similar to transmission coupler 26 except that transmission coupler 127 comprises a mechanism configured to selectively transmit force, power or torque from engine 22 to driven member 125. Transmission coupler 127 is actuatable or movable between a driving state in which engine 22 is operably coupled to driven member 125 and an idling state in which engine 22 is operably decoupled from driven member 125. Transmission coupler 127 is configured to permit the supply of torque or power from engine 22 to driven member 125 to be stopped or interrupted such that driven member 125 may idle while engine 22 is still running. In one embodiment, transmission coupler 127 may comprise a clutch. In other embodiments, transmission coupler 127 may comprise other similar devices allowing the supply of power are torque from engine 22 to driven member 125 to be interrupted while engine 22 is running.

Manual actuator 129 is similar to manual actuator 28 in that manual actuator 129 comprises one or more members configured to be engaged or contacted by the physique of a person using implement 20, such as by one or more hands or feet of a person. Manual actuator 129 is operably coupled to transmission coupler 127 by one or more cables, linkages and the like (schematically represented by line 133) that transmit force or motion of manual actuator 129 to transmission coupler 127 to move transmission coupler 127 between the driving state and the idling state. In another embodiment, manual actuator 129 may be operably coupled to transmission lever in 127 by a powered actuator and an electrical switch. For example, in one embodiment, manual actuator or 129 may be configured to trip or actuate an electrical switch upon being moved, wherein a powered actuator, such as an electric solenoid, engages and moves transmission coupler 127 between the driving state and idling state in response to tripping of the switch.

In one embodiment, manual actuator 129 comprises a pivoting handle or lever. In one embodiment, manual actuator 129 comprises such a lever positioned adjacent to a stationary handle or grip, wherein the lever may be pivoted against the bias of one or more springs into close proximity with the grip. For example, in one embodiment, the lever may be pivoted to a position substantially parallel to the grip. In other embodiments, manual actuator 129 may comprise a bail which pivots between different positions. In other embodiments, manual actuator 129 may comprise a push button, a sliding switch, a pedal, a pull rod, a push rod or the like.

As shown by FIG. 2, in addition to being operably coupled to transmission coupler 127, manual actuator 129 is also operably coupled to speed control lever 30. In one embodiment, manual actuator 129 is connected to speed control lever 30 by connector 135 (schematically shown).

In one embodiment, connector 135 is configured such that movement of manual actuator 129 in a first direction results in the movement of the control lever in the same first direction. In another embodiment, manual actuator 129 may be coupled to speed control lever 30 by connector such that movement of manual actuator 129 in the first direction moves as the control lever in a second opposite direction or in a direction different than the first direction. In one embodiment, the connector 135 may be unidirectional such that connector 135 is capable of being placed in tension, whereby the controller 30 may be pulled by connector 135 but may not be pushed by connector 135. In another embodiment, connector 135 may be bidirectional such that forces may be exerted upon speed control lever 30 in both directions (speed control lever 30 may be pushed or pulled by connector 135 depending upon the direction of force applied to connector 135 by movement of manual actuator 129).

In one embodiment, connector 135 may comprise a flexible member such as a wire, chain, belt or cable. For example, in one embodiment, connector 135 may comprise Bowden cable. In yet another embodiment, connector 135 may comprise an assembly of one or more rigid linkages.

In one embodiment, connectors 34 and 135 are configured to cooperate with one another such that actuation or movement of either manual actuator 128 or manual actuator 129 or movement of both manual actuators 28 and 129 results in speed control lever 30 being moved from a first speed position to a second speed position. In such an embodiment, it does not matter which of actuator 28, 129 are actuated or moved; speed control lever 30 is automatically also moved to the same extent or the same position in either case. In such an embodiment, manual actuators 28, 129 may alternatively be connected to a single connector 34 or a single connector 135.

In yet another embodiment, connectors 34 and 135 are configured to cooperate with one another such that actuation or movement of manual actuator 28 results in speed control lever 30 being moved from a first speed position to a second speed position and such that actuation or movement of manual actuator 129 results in speed control lever 30 being moved to a third speed position different than the first speed position and the second speed position. In particular, when manual actuator 28 is already actuated or moved, additional actuation or movement of manual actuator 129 results in speed control lever 30 being moved from the second position to the third position. When manual actuator 129 is actuated or moved and manual actuator 28 is not actuated or moved, speed control lever 30 moves from the first speed position to the third speed position. In such an embodiment, engine 22 operates at different engine speeds depending upon which of driven members 24 and 125 are being driven by engine 22.

In still another embodiment, connectors 34 and 135 may be configured to cooperate with one another such that engine 22 is automatically adjusted between four distinct or different engine speeds depending upon whether manual actuator 28 is actuated, on whether manual actuator 129 is actuated, whether both manual actuators 28 and 129 or actuated or whether neither of manual actuators 28 or 129 are actuated.

For example, when neither of actuators 28, 129 are actuated (no forces being applied to speed control lever 30 by manual actuator 28 or manual actuator 129), speed control lever 30 may be automatically biased by a bias or spring to a first low-speed position. When actuator 28 is actuated, speed control lever 30 may be moved against the bias to a second speed position greater than the first low speed position. Alternatively, when actuator 129 is actuated, speed control lever 30 is moved against the bias to a third speed position greater than the second speed position. This may be beneficial where driven member 125 may better operate at a higher engine speed. When both actuator 28 and 129 are actuated, speed control lever 30 may be moved against the bias to a fourth speed position greater than the third speed position. This may be beneficial in those circumstances where operation of both driven members 24 and 125 is enhanced at an even higher engine speed.

Figure 3:
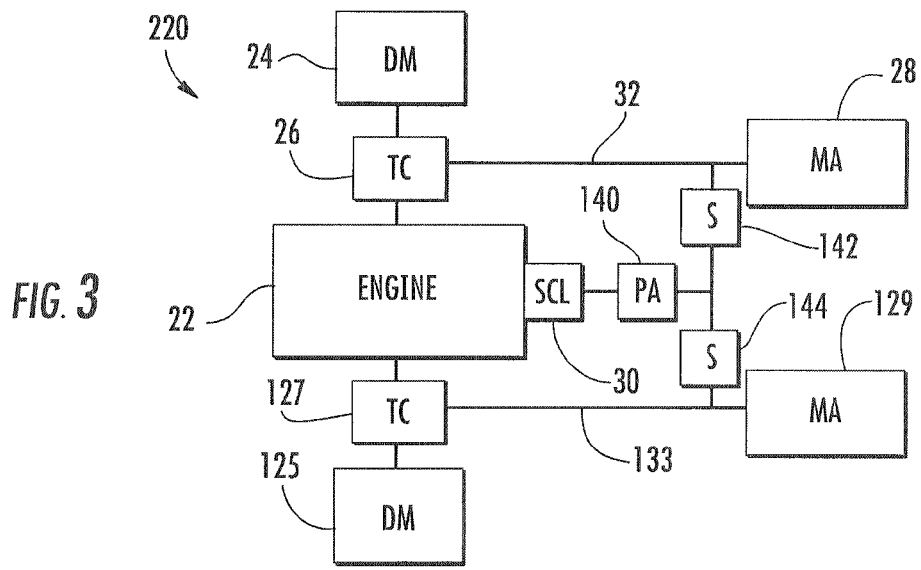
FIG. 3 is a schematic illustration of another embodiment of the powered implement of FIG. 1.

FIG. 3 schematically illustrates powered implement 220, another embodiment of powered implement 20 shown in FIG. 1. Powered implement 220 is similar to powered implement 120 except that powered implement 220 includes powered actuator 140 and sensors 142, 144 in place of connectors 34 and 135. The remaining elements of powered implement 220 which correspond to elements of powered implement 120 are numbered similarly. Like powered implement 120, powered implement 220 provides for automatic engine speed adjustment in response to engagement or disengagement of driven members 24, 125 by manual actuator's 28, 129, respectively.

Powered actuator 140 comprises an actuator configured to generate force or movement (as compared to merely transmitting force or movement). Powered actuator 140 is operably coupled to speed control lever 30 such that the force or motion generated by powered actuator 140 results in movement of speed control lever 30. In one embodiment, the force or motion generated by powered actuator 140 and transmitted to speed control lever 30 moves speed control lever 30 against a bias from a first speed position to a second speed position. In one embodiment, powered actuator 140 may comprise an electric solenoid. In another embodiment, powered actuator 140 may comprise a hydraulic or pneumatic cylinder-piston assembly. In still other embodiments, powered actuator 140 may comprise other such devices.

Sensors 142, 144 comprise devices configured to sense movement or actuation of manual actuators 28, 129, respectively. Sensors 142, 144 are further configured to communicate with powered actuator 140 or to transmit signals to powered actuator 140 to control, initiate or stop the application of force or motion by powered actuator 140 to speed control lever 30. For example, in one embodiment, sensors 142 144 may comprise electrical contacts switches which are triggered (such as to complete an electrical circuit) upon sufficient movement of manual actuators 28 and 129, respectively. Upon such triggering, electrical signals or current is transmitted across the switch to powered actuator 140 which causes powered actuator 140 to generate force or motion which results in speed control lever 30 being moved between different speed positions. In one embodiment, triggering of either or both of sensors 142, 144 causes electrical power or logical signals to be conducted to powered actuator 140, comprising an electric solenoid, which then moves speed control lever 30 from a first speed position to a second speed position.

As with powered implement 120, powered implement 220 may be set up or configured to operate in one of a variety of different selectable modes of operation. In a first mode of operation, actuation of either one of manual actuators 28, 129 or both of manual actors 28, 129 results in the control lever 30 being moved to the same speed position. In a second mode of operation, actuation of manual actuator 28 results in speed control lever 30 being moved to a first speed position and actuation of manual actuator 29 (without actuation of manual actuator 28) results in speed control lever 30 being moved to a second speed position different than the first speed position. In yet a third mode of operation, actuation a manual actuator 28 results in speed control lever 30 being moved to a first speed position, manual actuator of manual actuator 129 results in speed control lever being moved to a second speed position different than the first speed position and manual actuation of manual actuators 28 and 129, concurrently, results in speed control lever 30 being actuated to a third speed position. Speed control lever 30 automatically defaults to a fourth speed position when neither manual actuator 28 nor manual actuator 129 are moved, depressed, pivoted or otherwise actuated.

Such different modes may be achieved in implement 220 by configuring powered actuator 140 and sensors 142, 144 such that powered actuator 140 applies a different degree of force or different extent of motion to speed control lever 30 depending upon what signals or voltages are received as a result of either or both of sensors 142, 144 being triggered. For example, sensors 142 144, when triggered, may connect powered actuator 140 to different power sources or different voltage supplies, wherein the different voltages received by powered actuator number 140 cause powered actuator 140 to differently move speed control lever 30. In one embodiment, powered implement 220 may be provided with an ASIC, processing unit or other controller permitting a person to select one of three modes of operation. In other embodiments, powered implement 220 may be provided with only one of the three modes.

FIG. 4 illustrates powered implement 320, a particular embodiment of powered implement 120. Powered implement 320 is similar to powered implement 120 except that powered implement 320 specifically includes speed control lever 330 and connectors 334, 335 in lieu of speed control lever 30 and connectors 34, 135. Those remaining elements of implement 320 which correspond to elements of implement 120 are numbered similarly. In addition to those elements shown in FIG. 4, implement 320 includes engine 22, driven members 24, 125 and transmission couplers 26, 127 (shown in FIG. 2).

Speed control lever 330 comprises a lever configured to rotate or pivot about axis 346 between different speed positions. Speed control lever 330 is connected to engine 22 (shown in FIG. 2) such that movement of speed control lever 330 between the different speed positions results in engine 22 being run at different engine speeds. As shown by FIG. 4, when speed control lever 30 is rotated about axis 346 in a counter-clockwise direction (as seen in FIG. 4), the control lever 330 moves to an ever decreasing or slower speed position. In contrast, rotation or pivoting of the control lever 330 in a clockwise direction (as seen in FIG. 4) results in engine 22 being adjusted to an ever-increasing or faster engine speed.

Connectors 334 and 335 operably connect manual actuators 28 and 129 to speed control lever 330. In the example illustrated, connectors 334, 335 include bracket 348, bias 350, cables 354, 355 and tension adjusters 358, 360. Bracket 348 comprises a rigid frame, bracket or other structure mounted, welded, fastened, bonded or otherwise joined to engine 22 or to a frame of implement 320. Bracket 348 serves as a foundation or base for grounding and locating bias 350 as well as cables 354, 355. Bracket 348 includes a first extension 362 connected to its bias 350 and a second extension 364 by which cables 354 and 355 are guided. In other embodiments, bracket 348 may be integrally formed as part of a single unitary body with the frame of implement 320 or with engine 22 of implement 320.

Bias 350 comprises a mechanism configured to resiliently urge or bias speed control lever 330 towards a low-speed position. In the example illustrated, bias 350 comprises a tension spring having a first end connected to extension 362 and having a second end connected to speed control lever 330. In other embodiments, bias 350 may comprise other biasing structures such as a compression spring, a leaf spring or the like. For example, in one embodiment, bias 350 may comprise a torsion spring connected between bracket 348 and the control lever 330 about axis 346. In embodiments where speed control lever 330 is not biased to a default speed position, bias 350 may be omitted.

Cables 354, 335 comprise flexible members extending between manual actuators 28, 129 and speed control lever 330. In the example illustrated, cables 354, 355 comprise Bowden cables. In other embodiments, cables 334, 355 comprise other elongate flexible members or may comprise other linkages. Cables 354 and 355 are operably coupled between manual actuators 28 and 129 such that actuation of manual actuators 28, 129 results in movement or force being applied to speed control lever 330 to pivot speed control lever 330 in a clockwise direction (as seen in FIG. 4) against the bias of bias 350 to a higher or faster engine speed position.

In the example illustrated, tension adjusters 358, 360, comprising tension springs interposed between cables 354 and 355 and speed control lever 330, respectively. Tension adjusters 358, 360 provide some give or play, allowing partial or inadvertent movement of manual actuators 28, 129 to occur without corresponding immediate movement of the control lever 330. In other embodiments, tension adjusters 358 and 360 may be omitted where cables 354 and 355 are directly connected to speed control lever 330.

In one embodiment, bracket 348, bias 350, cables 354, 355 and tension adjusters 358, 360 may be provided as a kit or add-on assembly configured to be mounted to an existing powered implement. In such embodiments, bracket 348 will be mounted to the frame or engine of an existing powered implement and ends of cable 354, 355 would be connected to the existing manual actuators 28, 129 of the powered implement. In still other embodiment, the described components may be provided with the original manual actuators and assembled powered implement.

Figure 4A:
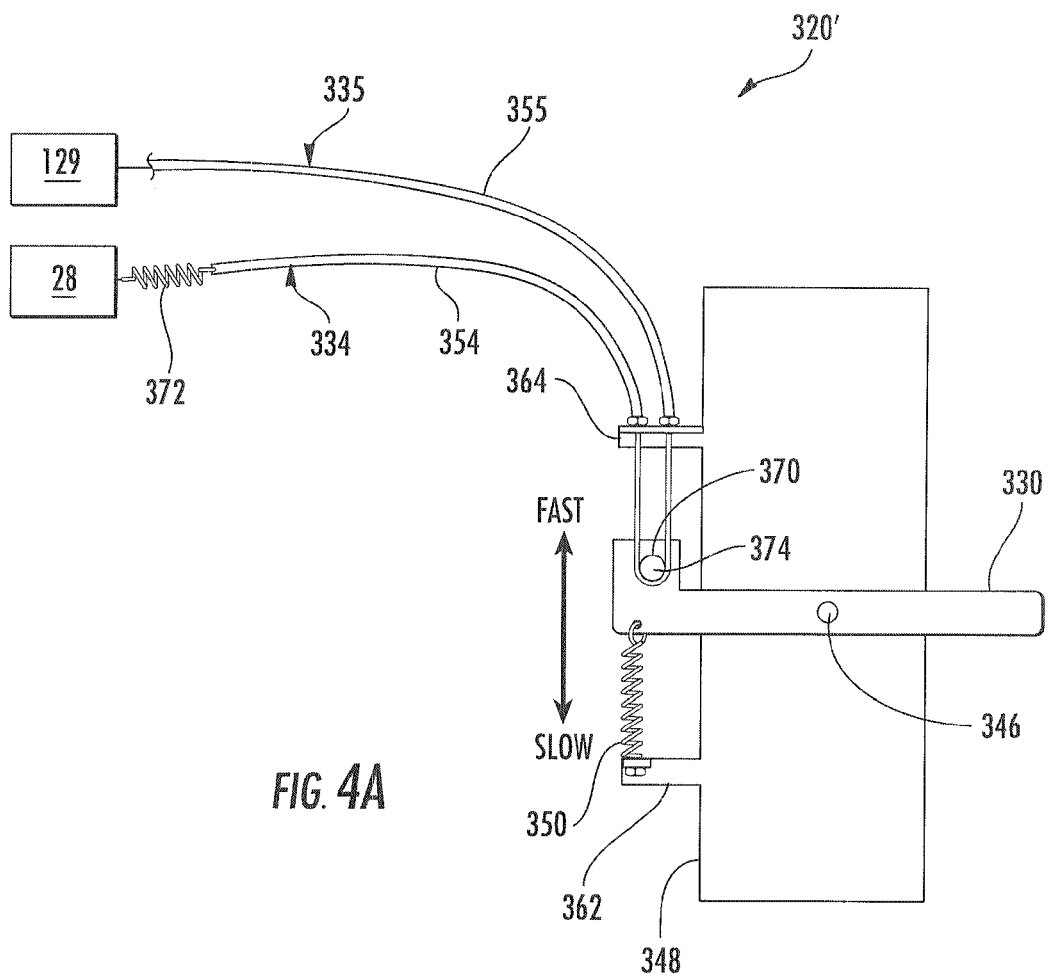
FIG. 4A is a schematic illustration of another particular embodiment of the powered implement of FIG. 2.

FIG. 4A illustrates, powered implement 320', another embodiment of powered implement 320. Powered implement 320' is similar to powered implement 320 except the powered implement 320' includes pulley 370 and includes tension adjuster 372 in place of tension adjusters 358 and 360. The remaining elements of powered implement 320' which correspond to powered implement 320 are numbered similarly.

Pulley 370 comprises a pulley rotatably supported by speed control lever 330 and configured to rotate about axis 374. Alternatively, pulley 370 may be stationarily fixed to speed control lever 330, wherein cables 354, 355 merely slide about an outer circumference of pulley 370. As shown by FIG. 4, cables 354 and 355 have ends connected to one another or are integrally formed as a single continuous cable that extends about pulley 370.

Tension adjuster 372 comprises a tension spring interposed along cables 354 and 355 and. Tension adjuster 372 provides some give or play, allowing partial or inadvertent movement of manual actuators 28, 129 to occur without corresponding immediate movement of the control lever 330. Although shown as being located along cable 354, tension adjuster 372 may be provided at a variety of different locations along either cable 354 or cable 355. In other embodiments, tension adjuster 372 may be omitted where cables 354 and 335 are directly connected to speed control lever 330.

In operation, actuation of manual actuator 28 pulls upon cable 354 to move speed control lever 330 from a first default speed position (maintained by bias 350) to a second speed position. Actuation of manual actuator 129 pulls upon cable 355 moving speed control lever 330 to the second speed position or a different speed position. Actuation of both actuators 28 and 129 moves speed control lever 330 to yet a fourth speed position. In some embodiments, pulley 370 may have an eccentric shape or may comprise a cam such that depressment or other actuation of actuators 28, 129 independent of one another results in speed control lever 330 being moved to different speed positions. In some embodiments, cables 354 and 355 may be fixed to pulley 370 so as to not slide relative to pulley 370. For example, cables 354 and 355 may have ends with rings which are pinned to pulley 370. In another embodiment, cables 354 and 355 may have ends which are pinched or clamped to pulley 370. In one embodiment, cables 354 and 355 may be part of one continuous cable, wherein the cable is fixed to pulley 370 by a pin, pinching, fastening, welding and the like. In some embodiments, the pulley 370 to which the cables 354, 355 are fixed may be eccentric, oval, oblong or have some other non-symmetric shape to provide distinct speed positions for lever 30 depending upon which combination of actuators 28, 129 are actuated.

Figure 5:
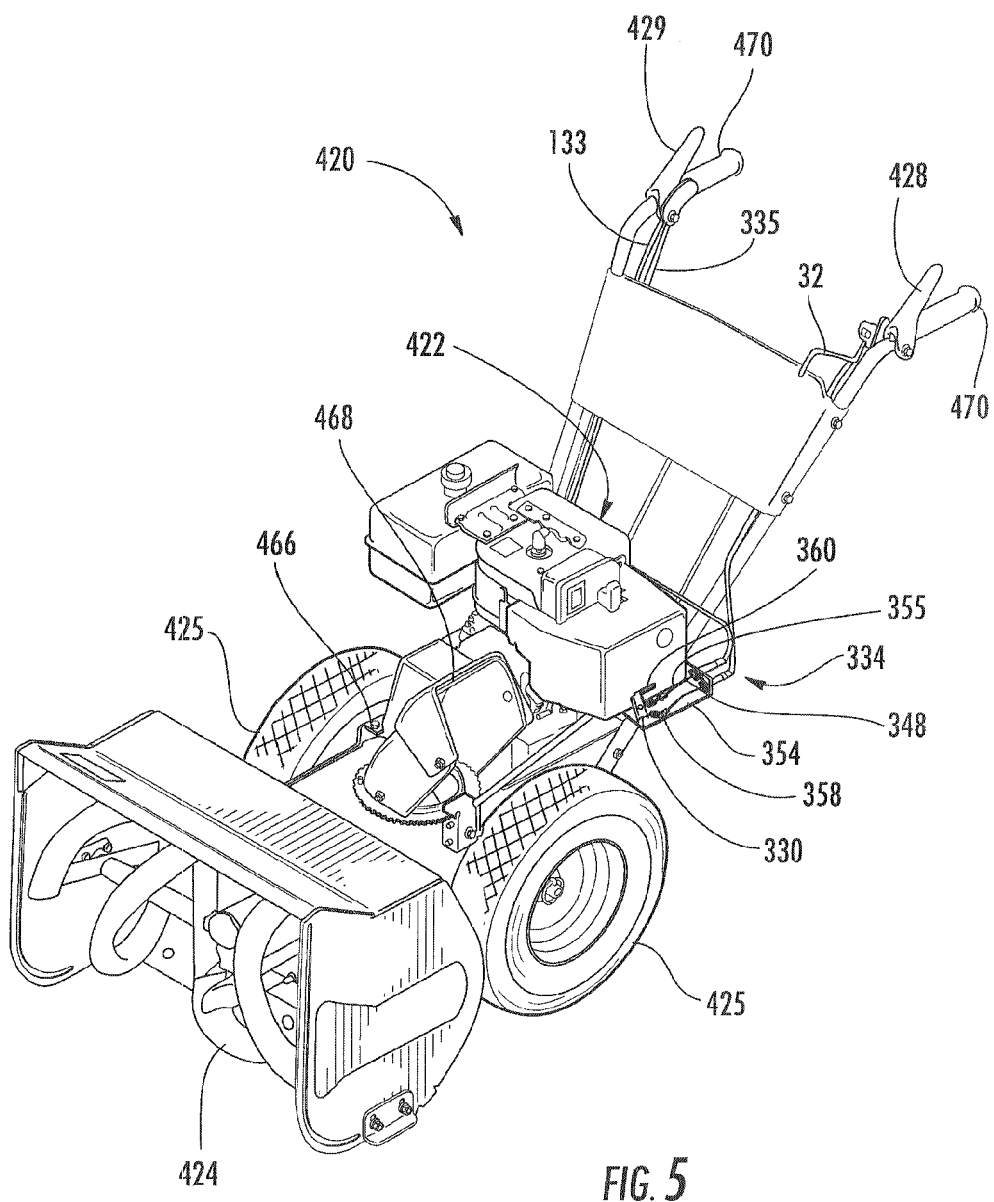
FIG. 5 is a top perspective view of another embodiment of the powered implement of FIG. 4.

FIGS. 5-11 illustrate powered implement 420, a particular embodiment of powered implement 320. Powered implement 420 is similar to powered implement 320 except that powered implement 420 is specifically embodied as a snow blower or snow thrower. As shown by FIG. 5, powered implement 420 includes engine 422, driven members 424, 425, transmission couplers 26, 127 (shown and described with respect of FIG. 2), manual actuators 428, 429 and connectors 334, 335 (described above with respect to implement 320).

Engine 422 comprises a small internal combustion engine, such as those commercially available from Briggs & Stratton. Engine 422 is mounted or supported by a general frame 466. Engine 422 includes speed control lever 330 (described above with respect to implement 320). Engine 422 supplies torque, power or motion to driven members 424 and 425 upon actuation or engagement of transmission couplers 26 and 127 (shown in FIG. 2). In particular, pivoting actuation of manual actuator 428 causes force or movement to be transmitted through connector 32 to transmission coupler 26 such that transmission coupler 26 operably connects engine 422 to driven member 424. Similarly, pivoting actuation of manual actuator 429 causes connector 133 to transmit such force or motion to transmission coupler 127 such that transmission coupler 127 operably connects engine 422 to driven member 425. In the example illustrated, connectors 32 and 133 comprise cables, such as Bowden cables, and transmission couplers 26, 127 comprise clutch arrangements.

Driven member 424 comprises one or more augers, which upon being driven, move and potentially propel or throw snow through chute 468. Driven member 425 comprises a set of wheels which provide traction with the underlying surface and which are driven to move implement 420 across the underlying surface. In other embodiments, driven member 425 may comprise a driven continuous track.

Figure 6:
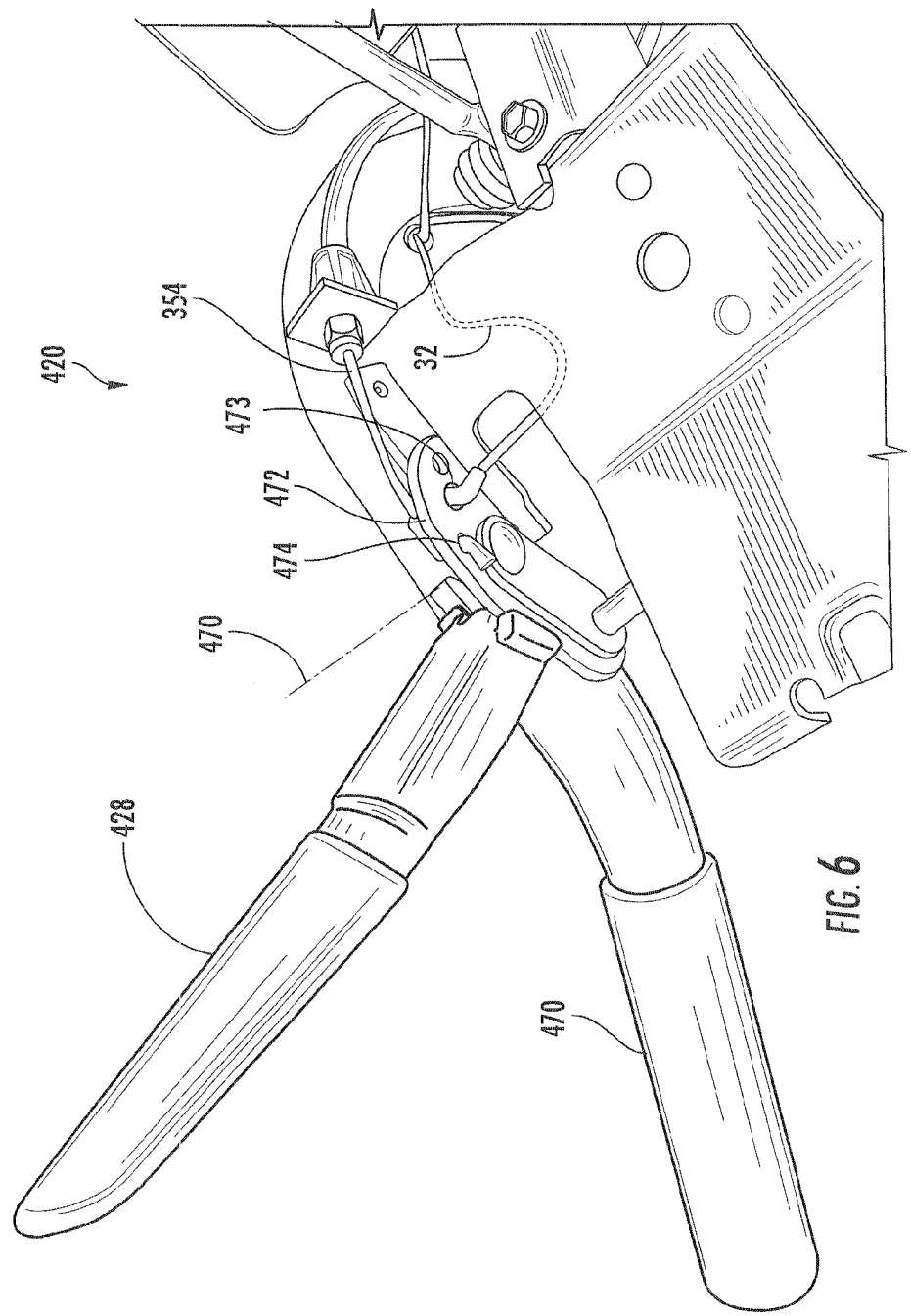
FIG. 6 is a fragmentary perspective view of a manual actuator of the implement of FIG. 5 in a default state.

Manual actuators 428, 429 comprise handles or levers pivotally proximate to hand grips through 470 of implement 420. Manual actuators 428, 429 are resiliently biased by springs (not shown) to their default positions as shown in which both transmission couplers 26 in 127 (shown in FIG. 2) are in idling states such that driven members 424 425 are also in idling states. As shown by FIG. 6, manual actuator 428 is pivotably supported about an axis 470 and as an extension through 472 extending on an opposite side of axis 470. Extension 472 is connected to connector 32 via a first opening 473 and is connected to cable 354 via a second opening 474. In other embodiments, extension 472 of manual actuator 428 may be connected to connector 32 and cable 354 in other manners. Manual actuator 429 is similarly configured and is similarly connected to its connector 133 and its cable 335.

During actuation, manual actuators 428, 429 are configured to be grasped and to be pivoted into substantially parallel positions with grips 470. Pivoting of manual actuator 428 pulls upon connector 32 which results in engine 422 being connected to driven member 424 to engage driven member 424. Pivoting of manual actuator 429 pulls upon connector 133 which results in engine 422 being connected to driven member 425 to engage to driven member 425. After will be described hereafter, manual pivoting of actuators 428, 429 also automatically adjusts the position of speed control lever 330 and the corresponding speed of engine 422.

Figure 7:
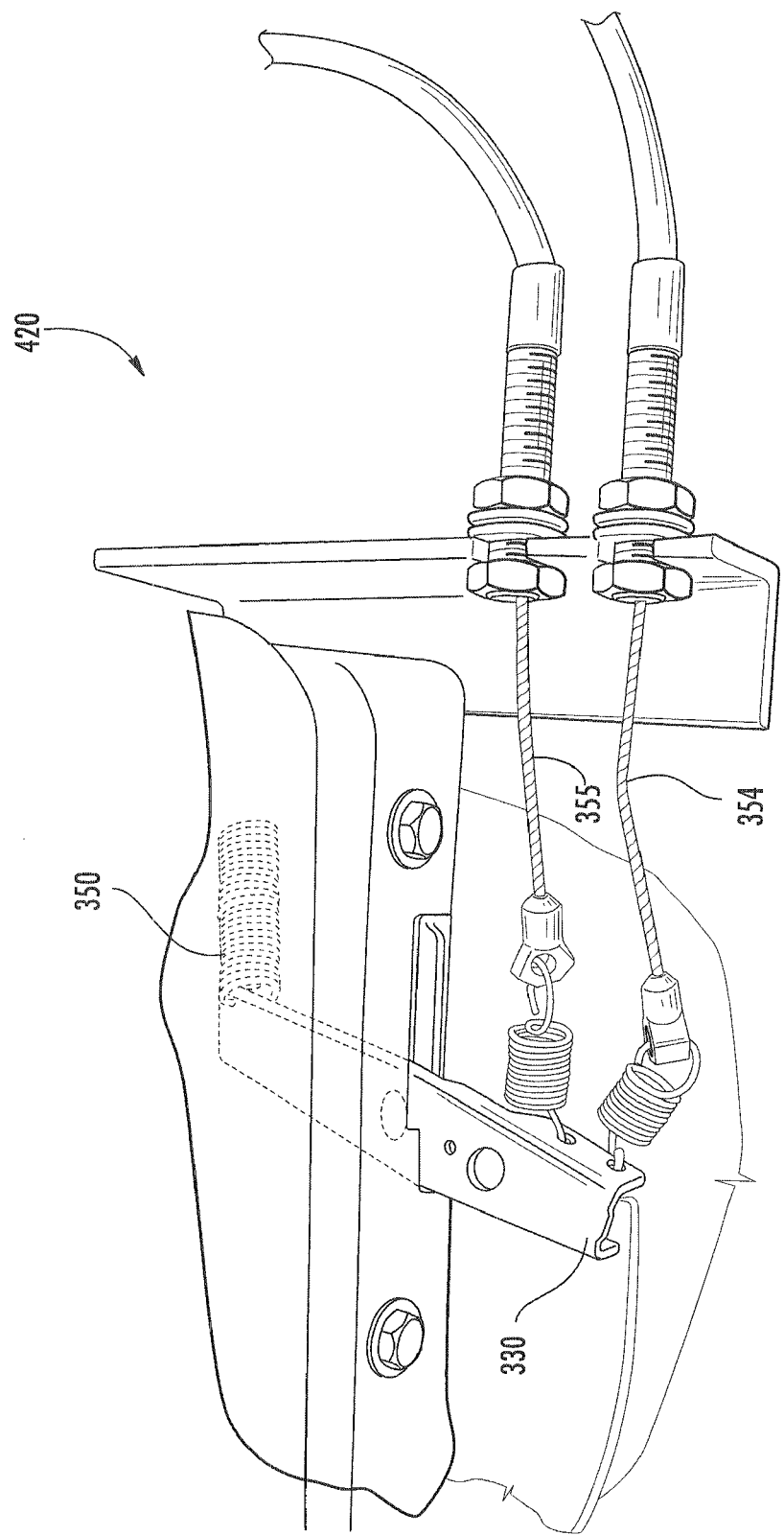
FIG. 7 is a fragmentary perspective view only a portion of the implement of FIG. 5 illustrating positioning of a speed control lever when both manual actuators of the implement are in default states.

FIGS. 6-11 illustrate such automatic movement of speed control lever 330 and the automatic adjustment of the speed of engine 422. FIG. 6 illustrates manual actuator 428 in its default state or position in which manual actuator 428 is biased away from grip 470. As shown in FIG. 5, manual actuator 429 is also in a similar released state in which manual actuator 429 is biased to its default position. As a result, as shown in FIG. 7, both of cables 354 and 355 are in released or flaccid states. Consequently, bias 350 is permitted to urge to the control lever 330 to its low-speed position. In other words, when neither the augers of driven member in role 424 or the wheels of driven member 425 are being driven by engine 422, engine 422 is automatically biased to a low-speed position or in idling position, reducing noise, engine wear and fuel consumption.

Figure 8:
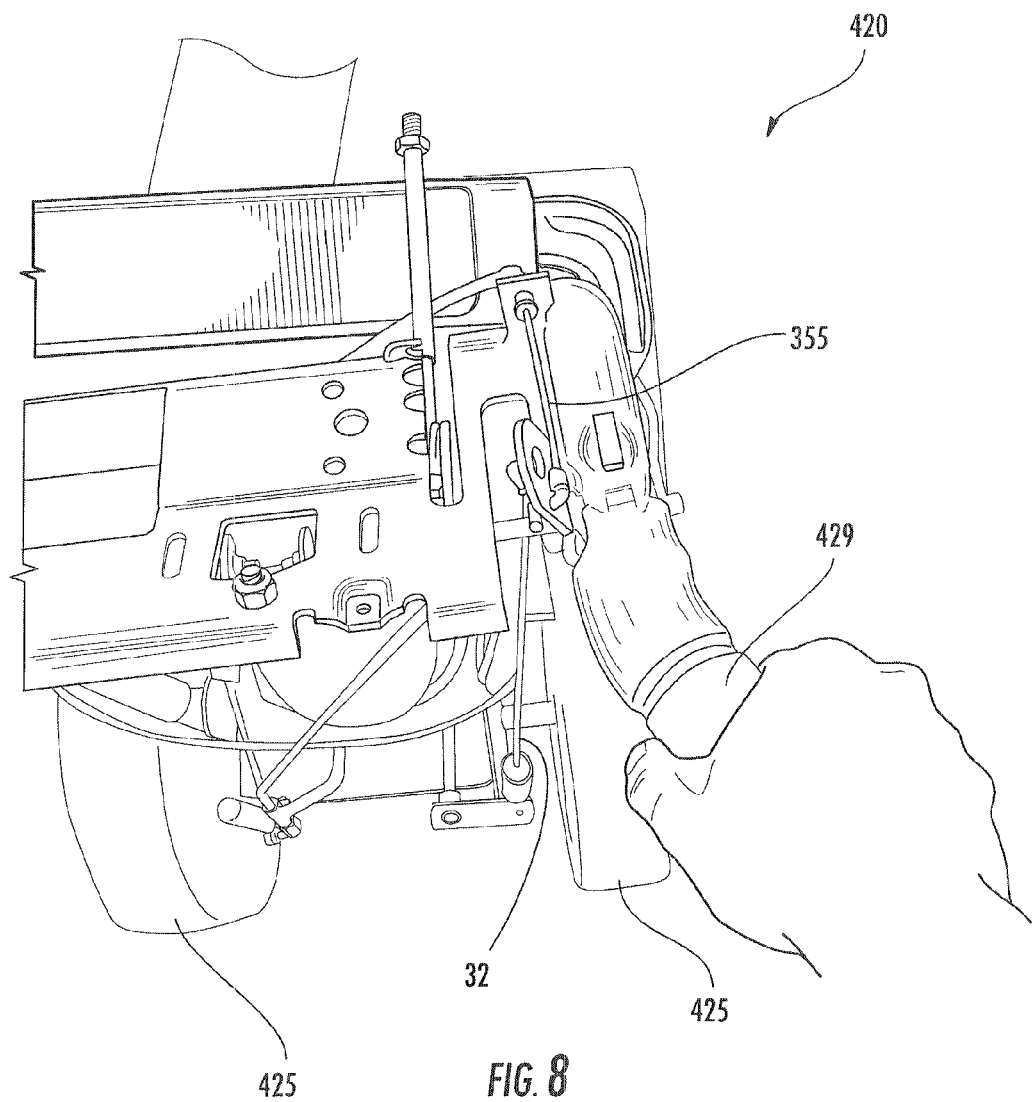
FIG. 8 is a fragmentary perspective view of one of the manual actuators of the implement of FIG. 4 being actuated.
Figure 9:
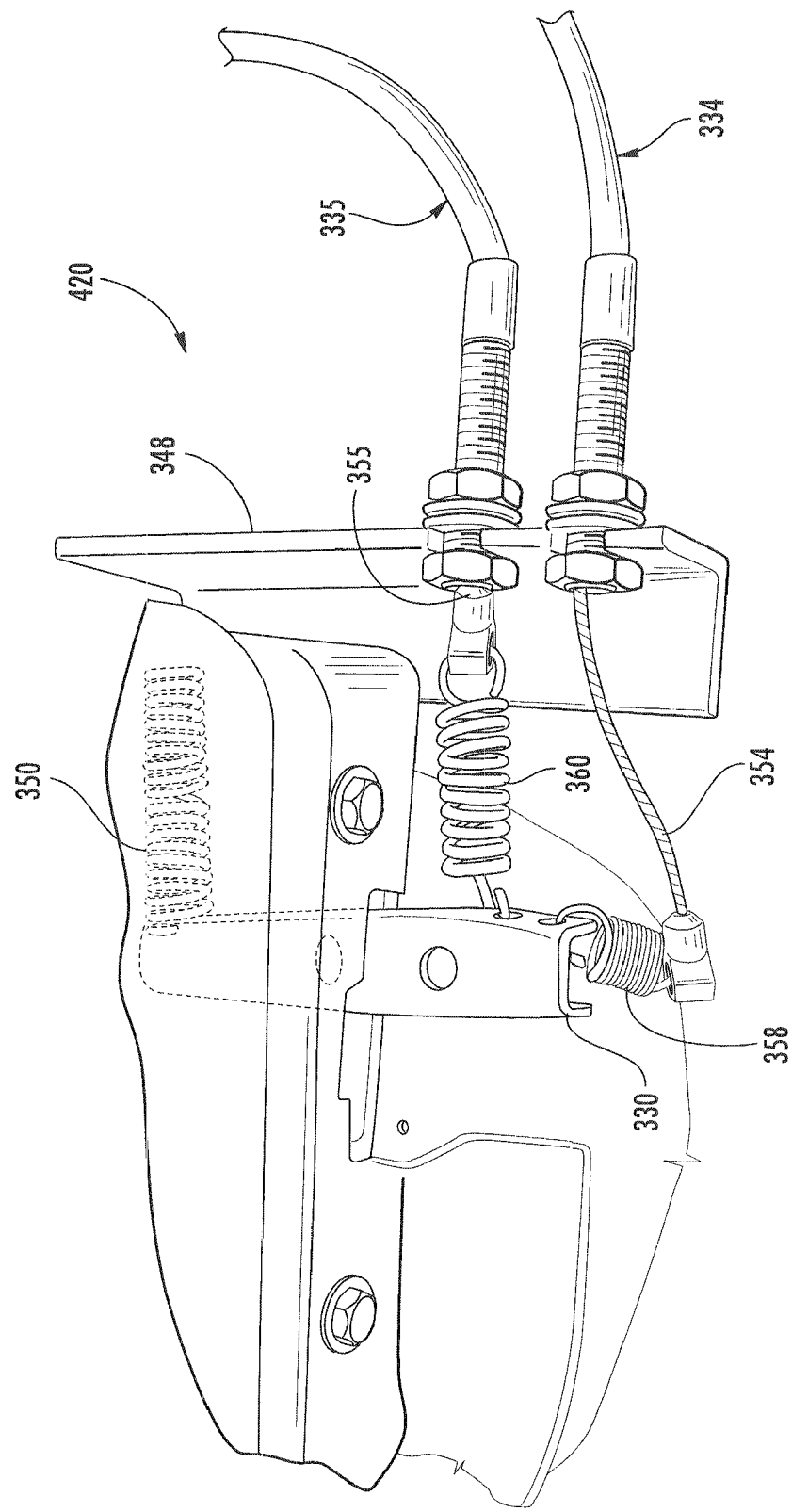
FIG. 9 is a fragmentary perspective view illustrating positioning of the speed control lever as a result of the actuation of the manual actuator shown in FIG. 8.

FIG. 8 illustrates pivoting of manual actuator 429 out of its default state to an actuated state substantially parallel to grip 470. As a result, as shown by FIG. 9, cable 355 is pulled. The spring of tension adjuster 360 is initially stretched. Continued pivoting a manual actuator 429 and pulling of cable 355 results in speed control lever 330 being pivoted against the bias of bias 353 to a higher-speed position.

Figure 10:
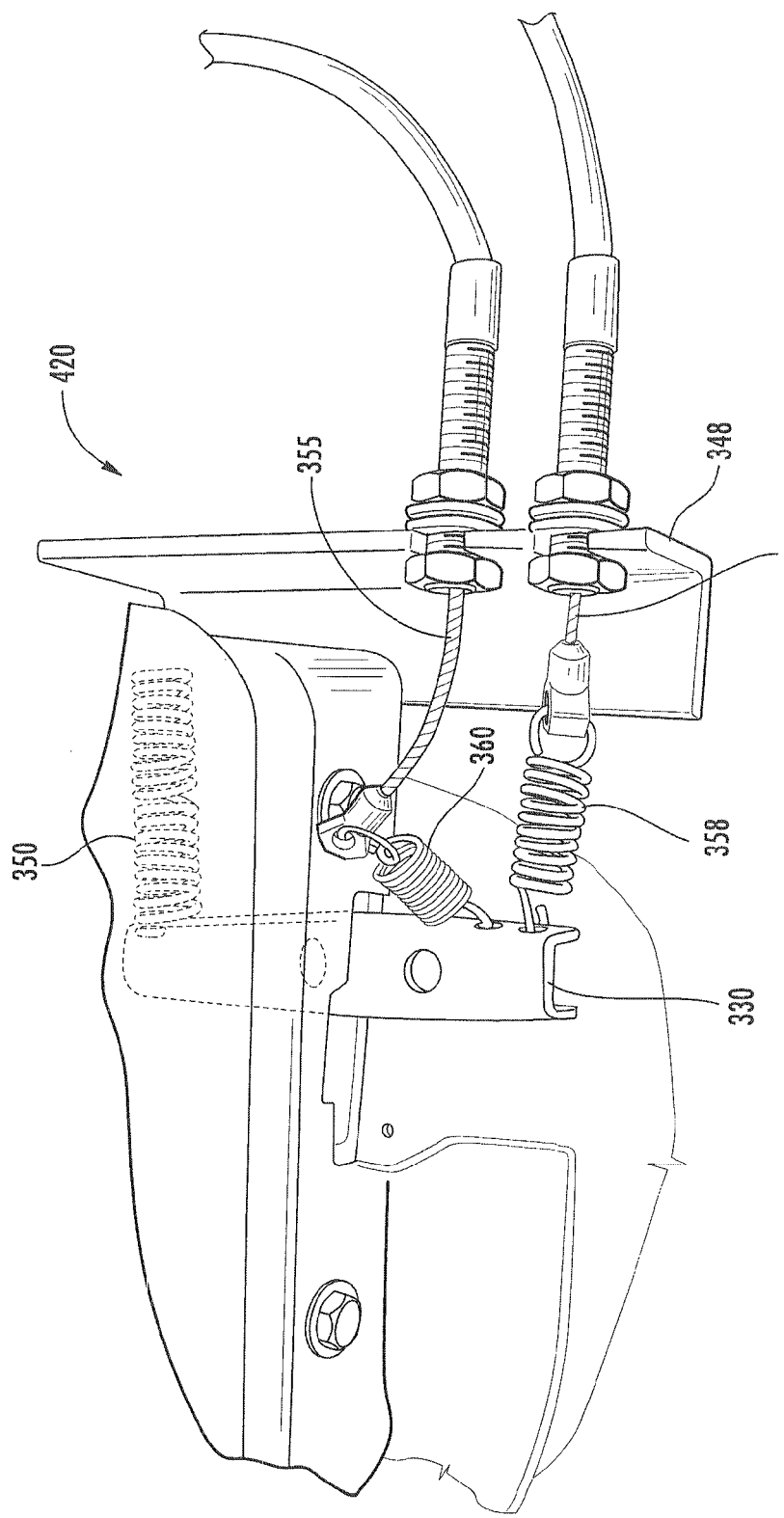
FIG. 10 is a fragmentary perspective view illustrating positioning of the speed control lever as a result of the actuation of the other manual actuator.

Manual actuation or pivoting of manual actuator 428 of speed control lever 330 against bias 350 in a similar fashion. FIG. 10 illustrates pivoting or actuation of manual actuator 428 (shown in FIG. 6). As shown by FIG. 10, this results in cable 354 being pulled. As a result, tension adjuster 358 is initially stretched and speed controller 330 is moved against bias 350 to a higher-speed position. As a result, engine 422 is automatically adjusted to a higher engine speed in response to engagement of driven member 425

Figure 11:
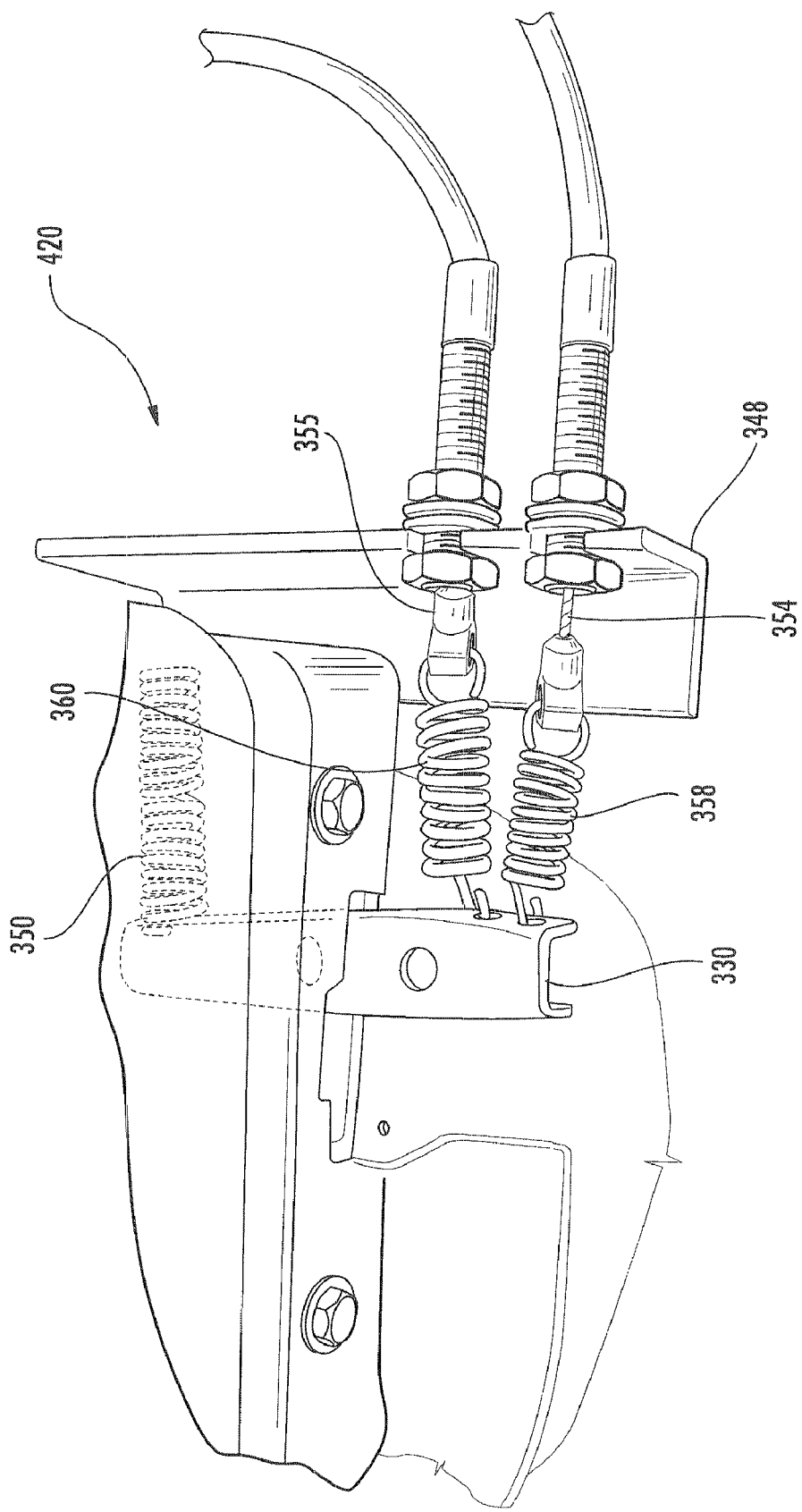
FIG. 11 is a fragmentary perspective view illustrating positioning of the speed control lever as a result of the actuation of the both manual actuators.

FIG. 11 illustrates concurrent manual actuation or pivoting of both manual actuators 428 and 429 from their default states. As shown by FIG. 11, this results in both cables 354 and 355 being pulled. This results in both tension adjusters 358 and 360 being stretched. This also results in the control lever 330 being pivoted and moved to a higher-speed position against bias 350. As a result, engine 422 is automatically adjusted to a higher engine speed when both driven member 424 (the auger) and driven member 425 (the self propel drive) are engaged (being powered by engine 422).

Figure 12:
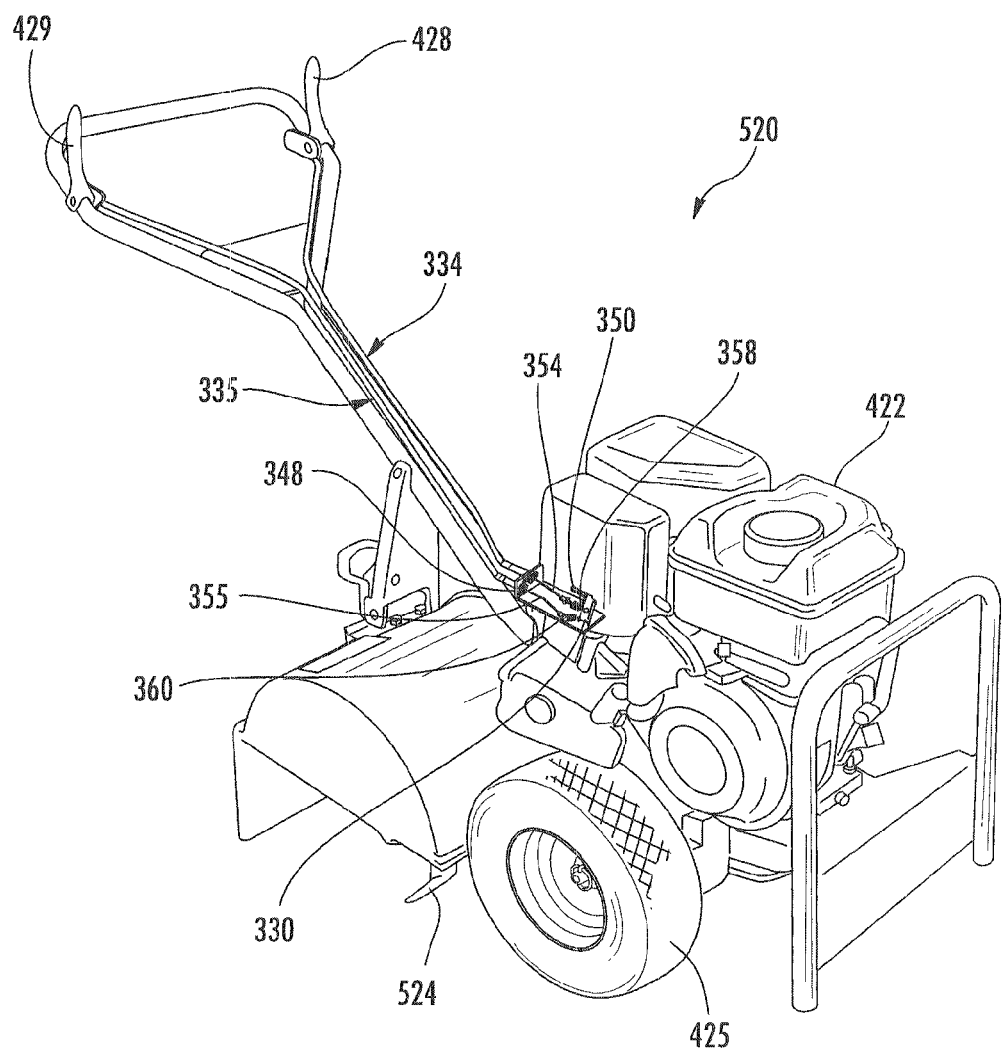
FIG. 12 is a top perspective view of another embodiment of the powered implement of FIG. 4 according to an example embodiment.

FIG. 12 illustrates powered implement 520, another embodiment of powered implement 420. Powered implement 520 is similar to powered implement 420 except that powered implement 520 is embodied as a cultivator or tiller. Powered implement 520 is similar to powered implement 420 except that powered implement 520 includes driven members 524 in lieu of driven members 424. Many of the remaining components or elements of powered implement 520 are similar to powered implement 420. For example, like powered implement 420, powered implement 520 includes engine 422, driven members 425, transmission couplers 26, 127 (shown and described with respect to FIG. 2) and manual actuators 428, 429.

Driven members 524 comprise blades configured interact with the ground or soil so as to overturn, mix and cultivate the soil. Driven members 524 are selectively operably coupled to engine 422 by transmission couplers 26, whereas transmission coupler 127 selectively operably couples engine 422 to driven member 425. As with powered implement 420, pivoting or manual actuation of either of manual actuators 428 or 429 automatically results in speed control lever 330 being given or moved against the bias of bias 350 (shown in FIG. 4) from a default lower speed position to a higher-speed position. When driven members 524 and 425 are to be idled (when engine for 22 is operably decoupled from both such driven members), bias 350 automatically moves speed control lever 330 to a default low-speed position. This results in the speed of engine 422 being automatically adjusted to reduce noise, engine wear and fuel consumption.

Figure 13:
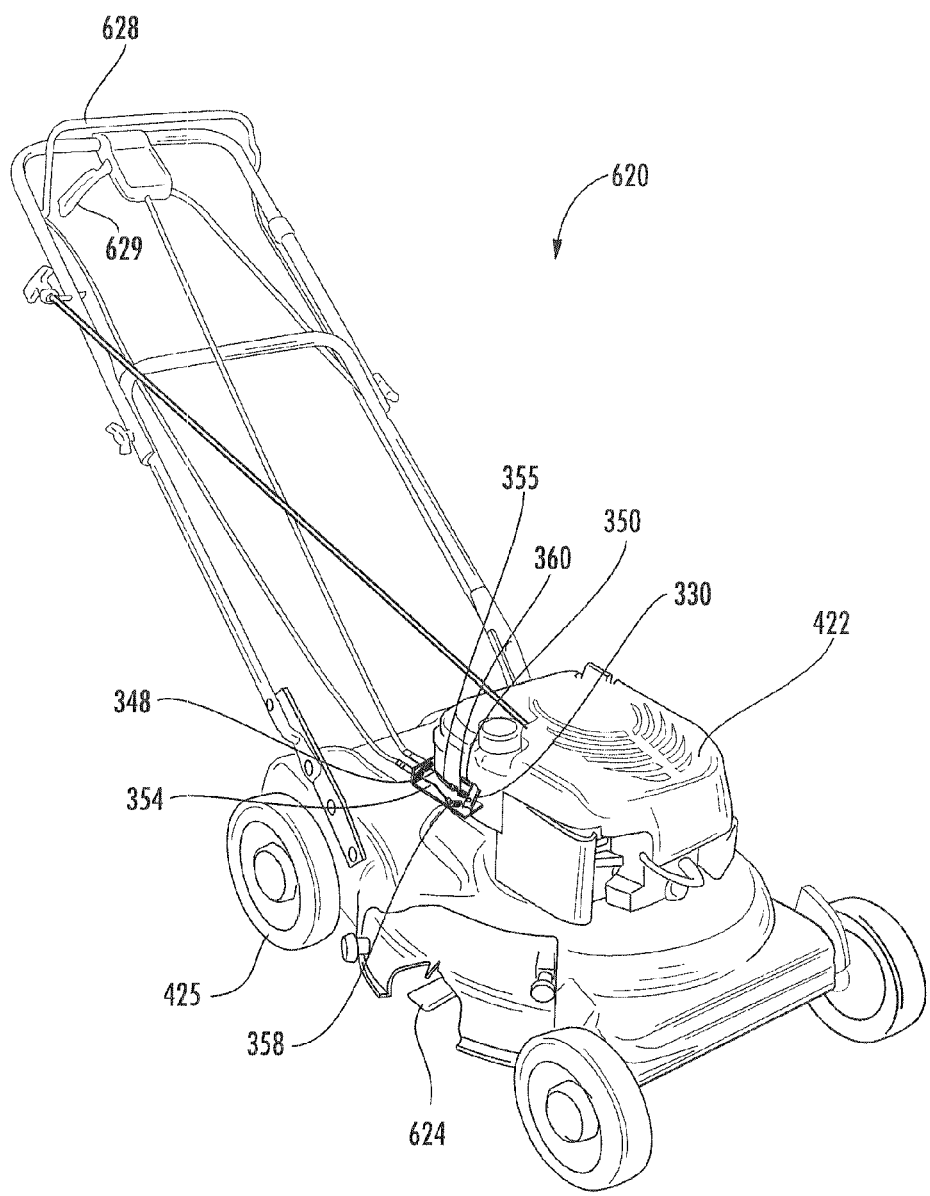
FIG. 13 is a top perspective view of another embodiment of the powered implement of FIG. 4 according to an example embodiment.

FIG. 13 illustrates powered implement 620, another embodiment of powered implement 420. Powered implement 620 is similar to powered implement 420 except that powered implement 620 is embodied as a self-propelled walk behind lawnmower. Powered implement 620 is similar to powered implement 420 except that powered implement 620 includes driven member 624 and manual actuators 628, 629 in lieu of driven members 424 and manual actuators 428, 429, respectively. Many of the remaining components or elements of powered implement 620 are similar to powered implement 420. For example, like powered implement 420, powered implement 620 includes engine 422, driven members 425, transmission couplers 26, 127 (shown and described with respect to FIG. 2).

Driven member 624 comprises a blade configured to interact with the plant life so as to cut or sever such plant life. Driven member 624 is selectively or operably coupled to engine 422 by transmission couplers 26 (shown in FIG. 2), whereas transmission coupler 127 selectively operably couples engine 422 to driven member 425.

Manual actuator 628 are similar to manual actuator 428, 429 except a manual actuator 620 comprises a bail configured to pivot between a default position in which transmission coupler 26 is in an idle state and in which driven member 624 is in an idle state and an engaged or actuated position in which transmission coupler 26 is in a driving state and in which driven member 624 is being driven by engine 422. Manual actuator 629 is similar to manual actuator 429 except a manual actuator 629 pivots about a distinct axis. Like manual actuator 429, manual actuator 629 pivots between a default position in which transmission coupler 127 is in an idle state and in which driven member 425 is in an idle state and an engaged or actuated position in which transmission coupler 127 is in a driving state and in which driven member 425 is being driven by engine 422 to propel or drive the lawnmower across the ground with the traction elements (wheels) of driven member 425.

As with powered implement 420, pivoting or manual actuation of either of manual actuators 628 or 629 automatically results in speed control lever 330 being driven or moved against the bias of bias 350 (shown in FIG. 4) from a default lower speed positioned to a higher-speed position. When driven members 624 and 425 are to be idled (when engine 422 is operably decoupled from both such driven members), bias

350 automatically moves speed control lever 330 to a default low-speed position. This results in the speed of engine 422 being automatically adjusted to reduce noise, engine wear and fuel consumption.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A powered implement comprising:
    an engine having a speed control lever movable between a first engine speed position and a second engine speed position;
    a first driven member rotatably supported for multi-revolutional continuous rotation while interacting with surrounding environment;
    a first transmission coupler movable between a first state in which the engine is operably coupled to the driven member to drive the driven member and a second state in which the engine is operably decoupled from the driven member;
    a first movable manual actuator, wherein the first movable manual actuator is operably coupled to the first transmission coupler to move the first transmission coupler between the first state and the second state in response to movement of the first manual actuator, which automatically results in the speed control lever being moved between the first speed position and the second speed position.

2. The powered implement of claim 1 further comprising:
    a second driven member;
    a second transmission coupler movable between a first state in which the engine is operably coupled to the second driven member to drive the second driven member and a second state in which the engine is operably decoupled from the second driven member;
    a second movable manual actuator, wherein the second movable manual actuator is operably coupled to the second transmission coupler to move the second transmission coupler between the first state and the second state in response to movement of the second manual actuator, which automatically results in the speed control lever being moved between the first speed position and the second speed position.

3. The powered implement of claim 2, wherein the first movable manual actuator and the second movable manual actuator are operably coupled to the speed control lever such that movement of one or both of the first movable manual actuator and the second movable manual actuator results in the speed control lever being moved between the first speed position and the second speed position.

4. The powered implement of claim 2 further comprising:
    a first transmission operably coupled to the first movable manual actuator and the speed control lever to transmit motion of the first movable manual actuator to the speed control lever; and
    a second transmission operably coupled to the second movable manual actuator and the speed control lever to transmit motion of the second manual actuator to the speed control lever.

5. The powered implement of claim 4, wherein the first transmission and the second transmission each comprises a cable.

6. The powered implement of claim 2 further comprising:
    a powered actuator configured to move the speed control lever between the first speed position and the second speed position;
    a first sensor configured to sense movement of the first movable manual actuator, wherein the powered actuator moves a speed control lever between the first speed position and the second speed position in response to movement of the first movable manual actuator; and
    a second sensor configured to sense movement of the second movable manual actuator, wherein the powered actuator moves in the speed control lever between the first speed position and the second speed position in response to movement of the second movable manual actuator.

7. The powered implement of claim 2, wherein the first driven member comprises a self-propelled drive for the powered implement.

8. The powered implement of claim 7, wherein the second driven member comprises a rotating blade.

9. The powered implement of claim 2, wherein the powered implement is selected from a group of powered implements consisting of: a snow thrower; a lawnmower; a rototiller; an aerator and an edger.

10. The powered implement of claim 1 further comprising:
    a bias coupled to the speed control lever and configured to resiliently bias the speed control lever to the first speed position, wherein movement of the first manual actuator causes the speed control lever to be moved against the first bias to the second speed position.

11. The powered implement of claim 1 further comprising:
    a transmission operably coupled to the first manual actuator and the speed control lever to transmit motion of the first manual actuator to the speed control lever.

12. The powered implement of claim 11, wherein the first transmission comprises a cable.

13. The powered implement of claim 1 further comprising:
    a powered actuator configured to move the speed control lever between the first speed position and the second speed position;
    a sensor configured to sense movement of the first manual actuator, wherein the powered actuator moves a speed control lever between the first speed position and the second speed position in response to movement of the first manual actuator.

14. The powered implement of claim 13, wherein the sensor comprises an electrical switch.

15. The powered implement of claim 13, wherein the powered actuator comprises an electric solenoid.

16. The powered implement of claim 1, wherein the first driven member comprises a self-propelled drive for the powered implement.

17. The powered implement of claim 1, wherein the first driven member comprises a rotating blade.

18. The powered implement of claim 1, wherein the powered implement is selected from a group of powered implements consisting of: a snow thrower; a lawn mower; a rototiller; an aerator and an edger.

19. A method comprising:
manually engaging a first manual actuator to move the first manual actuator from a first position to a second position to engage a first driven member rotatably supported for multi-revolutional continuous rotation while interacting with surrounding environment; and
moving a speed control lever from a first speed position to a second speed position automatically in response to movement of the first manual actuator from the first position to the second position.

20. An apparatus comprising:
a cable having a first portion configured to be attached to a manual actuator of a powered implement for engaging a driven member of the powered implement and a second portion configured to be attached to a speed control lever of an engine such that a movement of the manual actuator to engage the driven member also moves the speed control lever from a first speed position to a second speed position; and
a bias configured to be coupled to the speed control lever to bias the speed control lever to the first speed position.

21. The apparatus of claim 20, wherein the driven member is rotatably supported for multi-revolutional continuous rotation while interacting with surrounding environment.

22. A powered implement comprising:
an engine having a speed control lever movable between a first engine speed position and a second engine speed position;
a first driven member;
a first transmission coupler movable between a first state in which the engine is operably coupled to the driven member to drive the driven member and a second state in which the engine is operably decoupled from the driven member;
a first movable manual actuator, wherein the first movable manual actuator is operably coupled to the first transmission coupler to move the first transmission coupler between the first state and the second state in response to movement of the first manual actuator, which automatically results in the speed control lever being moved between the first speed position and the second speed position;
a second driven member;
a second transmission coupler movable between a first state in which the engine is operably coupled to the second driven member to drive the second driven member and a second state in which the engine is operably decoupled from the second driven member; and
a second movable manual actuator, wherein the second movable manual actuator is operably coupled to the second transmission coupler to move the second transmission coupler between the first state and the second state in response to movement of the second manual actuator, which automatically results in the speed control lever being moved between the first speed position and the second speed position.

23. The powered implement of claim 22, wherein the first movable manual actuator and the second movable manual actuator are operably coupled to the speed control lever such that movement of one or both of the first movable manual actuator and the second movable manual actuator results in the speed control lever being moved between the first speed position and the second speed position.

24. The powered implement of claim 22 further comprising:
a first transmission operably coupled to the first movable manual actuator and the speed control lever to transmit motion of the first movable manual actuator to the speed control lever; and
a second transmission operably coupled to the second movable manual actuator and the speed control lever to transmit motion of the second manual actuator to the speed control lever.

25. The powered implement of claim 24, wherein the first transmission and the second transmission each comprises a cable.

26. The powered implement of claim 22 further comprising:
a powered actuator configured to move the speed control lever between the first speed position and the second speed position;
a first sensor configured to sense movement of the first movable manual actuator, wherein the powered actuator moves a speed control lever between the first speed position and the second speed position in response to movement of the first movable manual actuator; and
a second sensor configured to sense movement of the second movable manual actuator, wherein the powered actuator moves in the speed control lever between the first speed position and the second speed position in response to movement of the second movable manual actuator.

27. The powered implement of claim 22, wherein the first driven member comprises a self-propelled drive for the powered implement.

28. The powered implement of claim 27, wherein the second driven member comprises a rotating blade.

29. The powered implement of claim 22, wherein the powered implement is selected from a group of powered implements consisting of: a snow thrower; a lawnmower; a rototiller; an aerator and an edger.

* * * * *